United States Patent
Meurer

[11] Patent Number: 5,211,851
[45] Date of Patent: May 18, 1993

[54] WATER CONDITIONING APPARATUS AND METHOD FOR CONDITIONING WATER

[76] Inventor: Wilhelm Meurer, 65 Wynford Heights Crescent, Appt. 1705, Don Mills, Ontario, Canada, M3C 1L7

[21] Appl. No.: 786,173

[22] Filed: Oct. 31, 1991

[30] Foreign Application Priority Data

Oct. 31, 1990 [DE] Fed. Rep. of Germany ....... 4034638
Nov. 8, 1990 [DE] Fed. Rep. of Germany ....... 4035563

[51] Int. Cl.⁵ .................... C02F 1/42; B01D 24/10; B01D 35/30
[52] U.S. Cl. .................... 210/670; 210/261; 210/282; 210/283; 210/284; 210/290; 210/232
[58] Field of Search ............... 210/264, 261, 266, 282, 210/283, 284, 290, 232, 234, 269

[56] References Cited

U.S. PATENT DOCUMENTS

| | | | |
|---|---|---|---|
| 547,547 | 10/1895 | Heideman | 210/290 |
| 550,706 | 12/1895 | Worthington | 210/264 |
| 661,339 | 11/1900 | Grever | 210/283 |
| 3,342,340 | 9/1967 | Shindell | 210/282 |
| 3,554,377 | 1/1971 | Miller | 210/283 |
| 3,986,960 | 10/1976 | Wire et al. | 210/232 |
| 4,025,426 | 5/1977 | Anderson et al. | 210/284 |
| 4,305,826 | 12/1981 | Moses | 210/290 |
| 4,368,123 | 1/1983 | Stanley | 210/290 |
| 4,541,926 | 9/1985 | Stanley | 210/284 |
| 4,773,979 | 9/1988 | Wahl | 210/266 |
| 4,795,563 | 1/1989 | Auchincloss | 210/662 |
| 4,810,379 | 3/1989 | Barrington | 210/282 |
| 4,826,594 | 5/1989 | Sedman | 210/283 |
| 4,855,046 | 8/1989 | Meehan | 210/284 |

*Primary Examiner*—Stanley S. Silverman
*Assistant Examiner*—Cynthia L. Nessler
*Attorney, Agent, or Firm*—Hoffman, Wasson & Gitler

[57] ABSTRACT

A water conditioning or purifying apparatus for preparing drinking water from tap water, incorporating a water inlet at the bottom area and a water outlet at the cover area. The water conditioning or purifying apparatus is provided with activated carbon and anion exchange material for filtering contaminants, and the casing is divided into a lower and an upper casing portion, which both can be removed from each other. The interior of the casing incorporates a first, lower chamber containing the activated carbon and a second, upper chamber containing anion exchange material. Both chambers are sealed at the top and at the bottom by filter fleeces. The water to be purified flows uniformly through the entire cross section of the casing and with the same speed from bottom to top.

12 Claims, 5 Drawing Sheets

WATER CONDITIONING APPARATUS AND METHOD FOR CONDITIONING WATER

BACKGROUND OF THE INVENTION

This invention pertains to a water conditioning or purifying apparatus and a water treating method, and more particularly to an apparatus of either portable or stationary type for removing harmful substances, especially chlorine, chlorinated carbon-hydrogens, pesticides, herbicides, insecticides, heavy metals and nitrates from tap-water sources for discharging high quality drinking water.

An embodiment of this type of apparatus is distributed by BFS Filtersysteme GmbH, Taunusstein, Germany, as TWF 2000N. It has a casing of plastic material with a cover, a cylindrical shell and a bottom. Within the cover an activated carbon filter rod is provided, which by a combined absorption and filtration effect purifies the tap water passing through the apparatus. For purifying the water activated carbon, which is chemically clean and has been pressed into powder, is used within the filter rod, which carbon removes chlorine, fluor-chloride hydrocarbons (FCKW), herbicides, pesticides, heavy metals and germs. Within the lower part of the apparatus an exchangeable small bag including anion exchanger material is provided, which removes nitrate from the tap water.

An apparatus of this type has essential disadvantages: On the one hand the filter rod is to be exchanged rather often, it is expensive to buy and thus the apparatus is not economic in operation. Furthermore, the filtering effect is not optimum and is not sufficiently effective, because the water to be purified cannot be maintained continuously and over a constant time period under the effect of the activated carbon powder, when the water is passed through the apparatus, because the water approaches the filter rod laterally and flows through the filter rod upwardly so that the distance the water flows within the filter rod depends on the fact whether the water enters the filter rod laterally further below or further above at the shell of the filter rod. Moreover, this type of apparatus has the disadvantage that the correct operation of the small bag comprising anion exchange material for removing the nitrate from the water is to be tested in regular, rather short intervals and is to be replaced repeatedly by a new bag. This also increases the costs for operating the apparatus. If the anion exchange material is to be inserted as a little bag the efficiency also cannot be an optimum, because the water to be purified is not continuously affected by the operation of this material.

SUMMARY OF THE INVENTION

According to the present invention, the water conditioning or water purifying apparatus is organized into two superimposed chambers, which operate as independent units, are separated from each other by filter fleeces and filter screens, and can be easily removed from each other. The lower chamber, which includes activated carbon, and the upper chamber, which includes anion exchange resin, fill the full volume of the casing so that the filter materials are arranged over the entire cross section of the chamber from the bottom to the top in a uniform and continuous manner.

The activated carbon in its granular and porous state conditions or purifies the through-flowing water intensively and continuously. Very small amounts of damaging materials, such as hydrocarbon materials, pesticides, herbicides, heavy metals, nitrites, and the like will be removed from the drinking water. At the same time, the water is dechlorinated. The activated carbon contained within the apparatus preferably is mixed with pure silver, for example 0.3% of the total weight, in order to exclude the formation of germs and bacteries within the water. The anion exchange material contained within the upper portion of the casing is a nitrate resin, which binds the harmful nitrate so that the conversion of nitrate into carcinogenic nitrite is excluded. The anion exchange material is strongly basic and operates nitrate-selective, which means it binds the nitrate positively and removes it from the water. Based on the rather large amount of anion exchange material within the apparatus (about 1 kg), the life-time respective input capacity of the anion exchange system is very high.

The nitrate load of the anion exchange material can be easily tested after a longer period of operation of the apparatus by using nitrate test strips, which are simply dipped into the purified water. If this test shows a nitrate load, the anion exchange material is to be regenerated. The user can regenerate the anion exchange material by unscrewing the upper casing portion from the apparatus, arranging the unscrewed portion with the cover upside down into the sink and connecting the water outlet with a bucket-like container so that the chamber turned upside down is rinsed in an opposite direction with water, which includes natrium chloride. Thus the anion exchange material is conditioned and regenerated. This regeneration process can be repeated without damaging or destroying the anion exchange material so that even with high nitrate content within the tap water, there is always regeneration, which means correctly operating anion exchange material is always available within the filter. This is most important for economically operating the purifying apparatus, because in this manner the rather high costs of buying spare cartridges can be dispensed with and the regeneration can be done by the user. Separating and assembling the upper and lower portions of the casing is extremely simple, because the upper portion of the casing has a firm bottom so that the anion exchange material does not need to be removed from the upper chamber.

A filter chamber filled with mineral substances, for example dolomite-filter stones, is provided at the water inlet of the apparatus, and at the upper end upstream of the water outlet. The water inlet and water outlet have a filter screen at the transition to the corresponding filter chamber so that the filtering of coarse particles is guaranteed. By a specific, thermal dissociation reaction, half of the carbon dioxide is released, which is associated to the magnesium proportion within the dolomite. The gravel-type grain of the filter stones, penetrated by pores, in combination with its coarse surface, effects fine-filtration. With water flowing, the bicarbonates dissolve from calcium and magnesium the valuable substances of which are added to the discharged water.

The distribution of the interior area of the apparatus into two chambers, one above the other with subdivisions by means of filter fleeces, is essential for the very intense operation of the water purifying apparatus. The arrangement of internal components is necessary in order to obtain an exact separation of the filter mediums, namely activated carbon and anion exchange material, and to prevent mixing of the two filter mediums. The arrangement of internal components is necessary to allow regeneration of the anion exchange material easily at any time, without burdening the silvering activated carbon, which otherwise could be damaged and would be less efficient. Furthermore, within two separate filter chambers, which are separated by filter fleeces, mineral stones are embedded, so that at least five filter fleeces are provided. The casing and the parts which are in contact with the filter materials, are made of high quality materials, namely V4A steel with titanium enclosure, food-proven plastics, water outlet chromed, special-perlator chromed. The water flows from the inlet to the outlet within the apparatus continuously free of turbulences and vortexes and free of pressure according to the upflow principle, so that the water flows upwards slowly and uniformly distributed over the entire cross-section of the chamber. For pressureless water distribution the inlet chamber is filled with gravel or mineral substances.

The apparatus is arranged within an outer container, which also serves as a packaging container for shipping the apparatus and contains all parts, materials and substances required for the operation of the water purifying apparatus. The outer container, which can be in the form of a bucket with lid and handle, is a closed unit. The outer container can also be used for cleaning and regenerating the anion exchange material by arranging the upper portion of the apparatus, which has been removed from the apparatus, turned upside down within a sink, then connecting the water outlet at the bucket-like container so that water provided with NaCl is urged from the cover to the bottom of the upper container portion. During the regeneration process, the bucket-like container must be positioned so that a difference in height exists between the exit of the bucket-type container and the water exit. During the regeneration operation, the upper portion of the apparatus is turned upside down for rinsing purposes. Subsequent thereto a rinsing step with normal tap water is performed.

For example, in hot weather countries, under continuous operation in caravans, or under such similar conditions, there is the danger that the drinking water is polluted with germs and bacteria. For this purpose the water outlet of the apparatus, from which the purified drinking water is discharged, is provided with a germ membrane. Said membrane can also be arranged at the water inlet or at any intermediate position. The germ membrane can be fastened to or integrated into the cover of the apparatus and also serves as a filter medium or a filter fleece, or the like, by removing bacteria and germs from the water which already has been or which is going to be treated. Samples of actual germ membranes are commercially available and are distributed for example by Messrs. Sartorius, Germany. The germ membrane can be in the shape of a plate, a plurality of parallel discs, accordion-type folded layers, or the like. The casing receiving the germ membrane is provided with ventilating means.

Accordingly, it is an object of the present invention to provide a water conditioning or purifying apparatus, which is extremely simple and effective in structure. A further object of this invention is a water conditioning or water purifying apparatus which can be operated free of maintenance over a long period of time so that it has a long life. Another object of this invention is to provide a water conditioning or purifying apparatus, which is economical in operation.

DESCRIPTION OF THE PREFERRED EMBODIMENT

Figure 1:
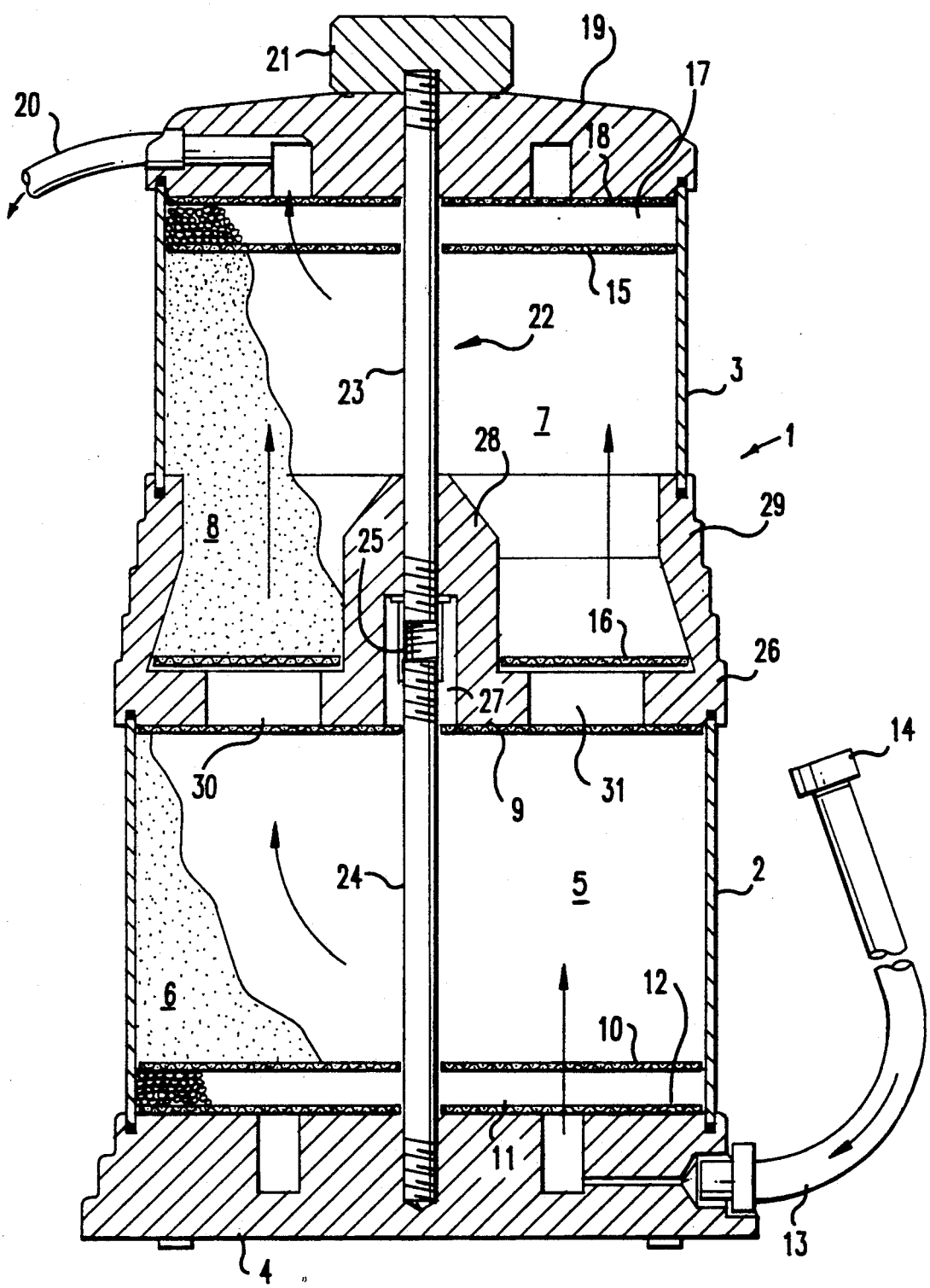
FIG. 1 is a cross-sectional view of a water conditioning or purifying apparatus according to this invention.

Referring now to the drawings, FIG. shows an illustration of one embodiment of the invention, which preferably is connected to a kitchen water spout.

The water conditioning or purifying apparatus 1 comprises a lower casing portion 2, an upper casing portion 3 and a bottom 4. The lower casing portion 2 receives the lower chamber 5, which houses activated carbon 6. The activated carbon 6 fills the volume of the lower chamber 5 entirely. Within the upper casing portion 3 is an upper chamber 7, which houses anion exchange material 8. The anion exchange material 8 fills the upper chamber 7 entirely. The lower chamber 5 is terminated by filter fleeces 9, 10. A filter chamber 11 is formed between filter fleece 10 and bottom 4, which receives mineral materials such as filter stones. The chamber 11 can be terminated by a further filter fleece 12 towards the bottom 4. A water inlet 13, through which the water to be purified is supplied into the water purifying apparatus 1, joins the bottom 4 laterally. The water inlet 13 is provided with a filter screen 14. The upper chamber 7 of the upper casing portion 3 is terminated at the top by filter fleeces 15, 16. Between the filter fleeces 15, 16, a filter chamber 17 is formed, which receives mineral substances such as filter stones. At the upper surface of the chamber 17, a further filter fleece 18 is provided, which is connected directly with the cover 19 of the apparatus 1. A water outlet 20 passes outwardly through the cover 19, from the upper side of the upper chamber 7 from which purified and filtered drinking water can be removed and used.

The upper side of the cover 19 is provided with a handle 21, from which a tie end 22 extends concentrically and continuously through the lower and the upper casing portion 2, 3, respectively to the bottom 4. The tie rod 22 comprises an upper rod section 23 and a lower rod section 24, which are screwed together at 25. The upper casing portion 3 includes a bottom 26, which has a recess 27 centrically located around the screw connection 25 of the connector rod sections 23 and 24. The center of the bottom 26 is formed into a vertically disposed cylinder 28. Openings 30 and 31 are passages from the lower chamber 5 to the upper chamber 7.

Figure 2:
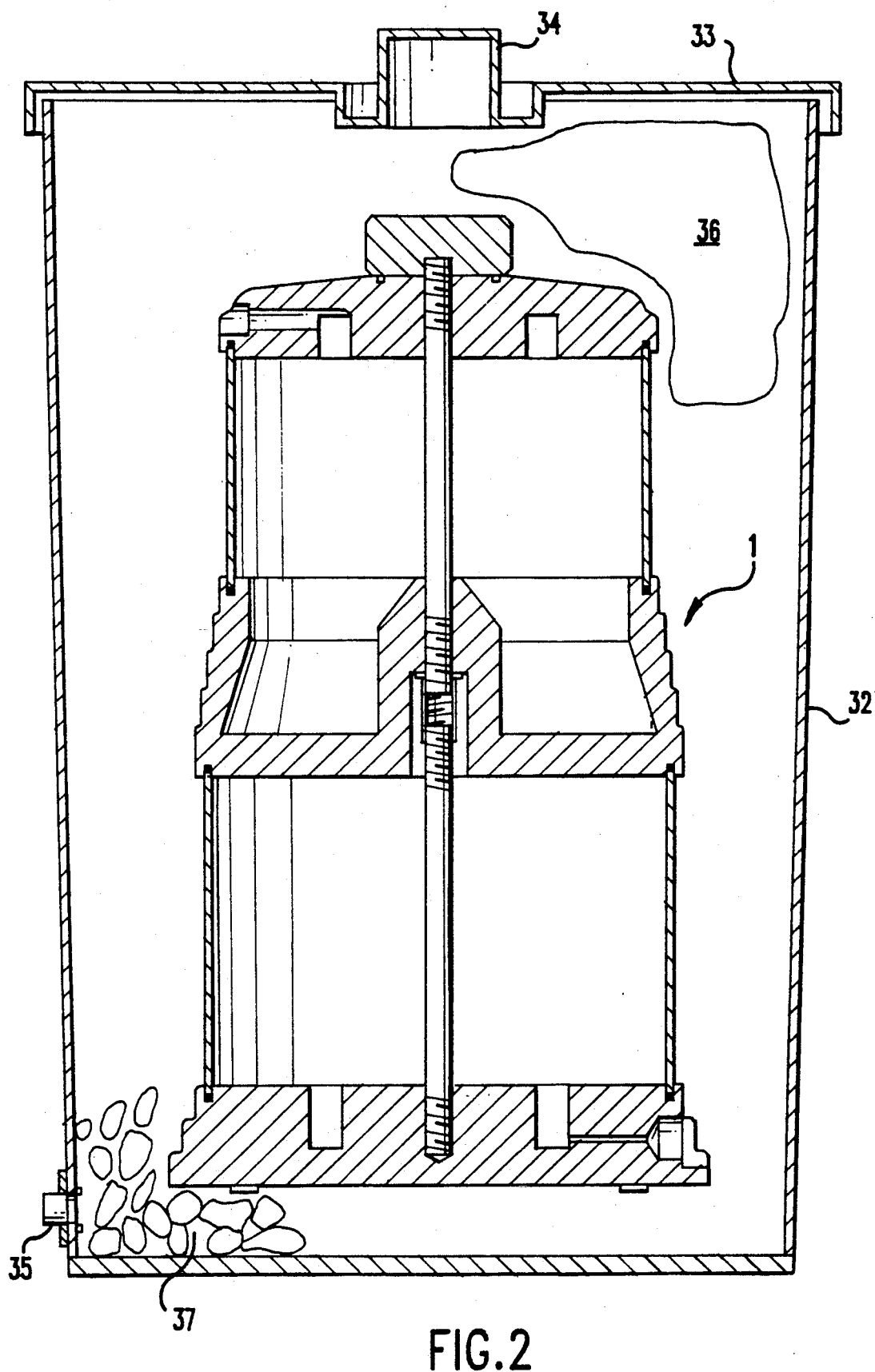
FIG. 2 is a schematic cross-sectional view of the apparatus according to FIG. 1 within a shipment package as a structural unit.

FIG. 2 shows the water conditioning or purifying apparatus located within a bucket-type container 32. The container 32 is provided with a lid 33 having a handle 34, and is preferably provided with a water outlet 35 at its lower end. Furthermore, within the container 32 is a flexible container 36 for taking up accessories required for operating the apparatus 1. The apparatus 1 is arranged within the container 32 in a substantially shock-proof and noiseless manner by filling the space between apparatus and the container walls 32 with resilient, shock-absorbing material 37, such as popcorn, plastic foam particles or the like.

Figure 3:
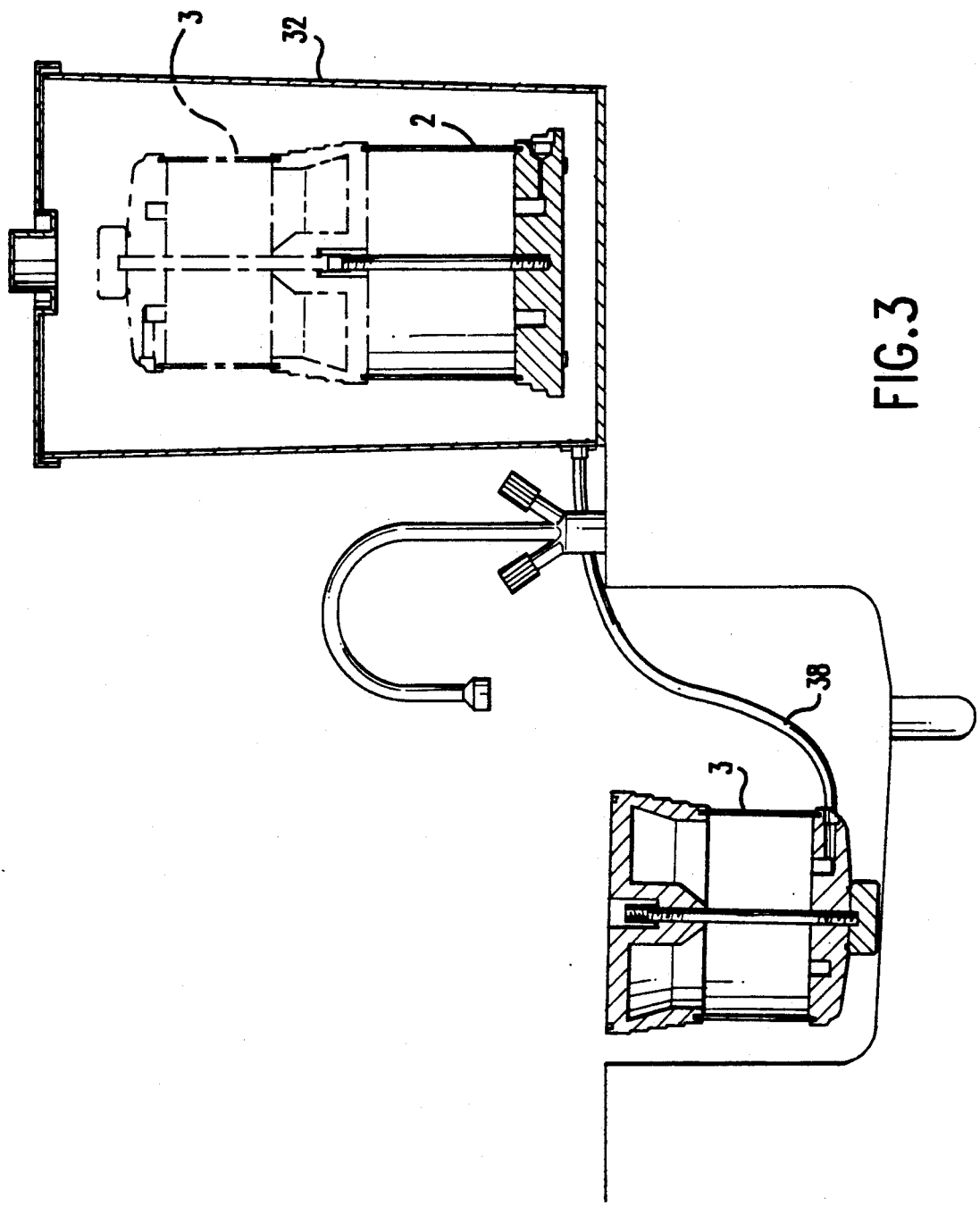
FIG. 3 is a schematic view of the apparatus according to FIG. 1 in the regeneration mode of the upper chamber.

FIG. 3 shows the process for regenerating the anion exchange material 8, wherein the cover 19 of the upper casing portion 3 is removed from the lower casing portion 2 so that the upper portion 23 of the tie rod 22 can be unscrewed from the lower portion 24 thereby allowing the upper casing portion 3 to be removed from the lower casing portion 2. The upper casing portion 3 is then turned upside down and put into a sink 39. A water hose 38 is connected between the water outlet 20 of the cover 19 and the outlet 35 of the container 32 so that water passes through the anion exchange material 8 of chamber 3 in an opposite direction to the nominal flow, thereby regenerating the anion exchange material 8. By means of this regenerating operation the activated carbon which is preferably silvered and contained within the lower chamber 5, will not be destroyed or damaged.

Figure 4:
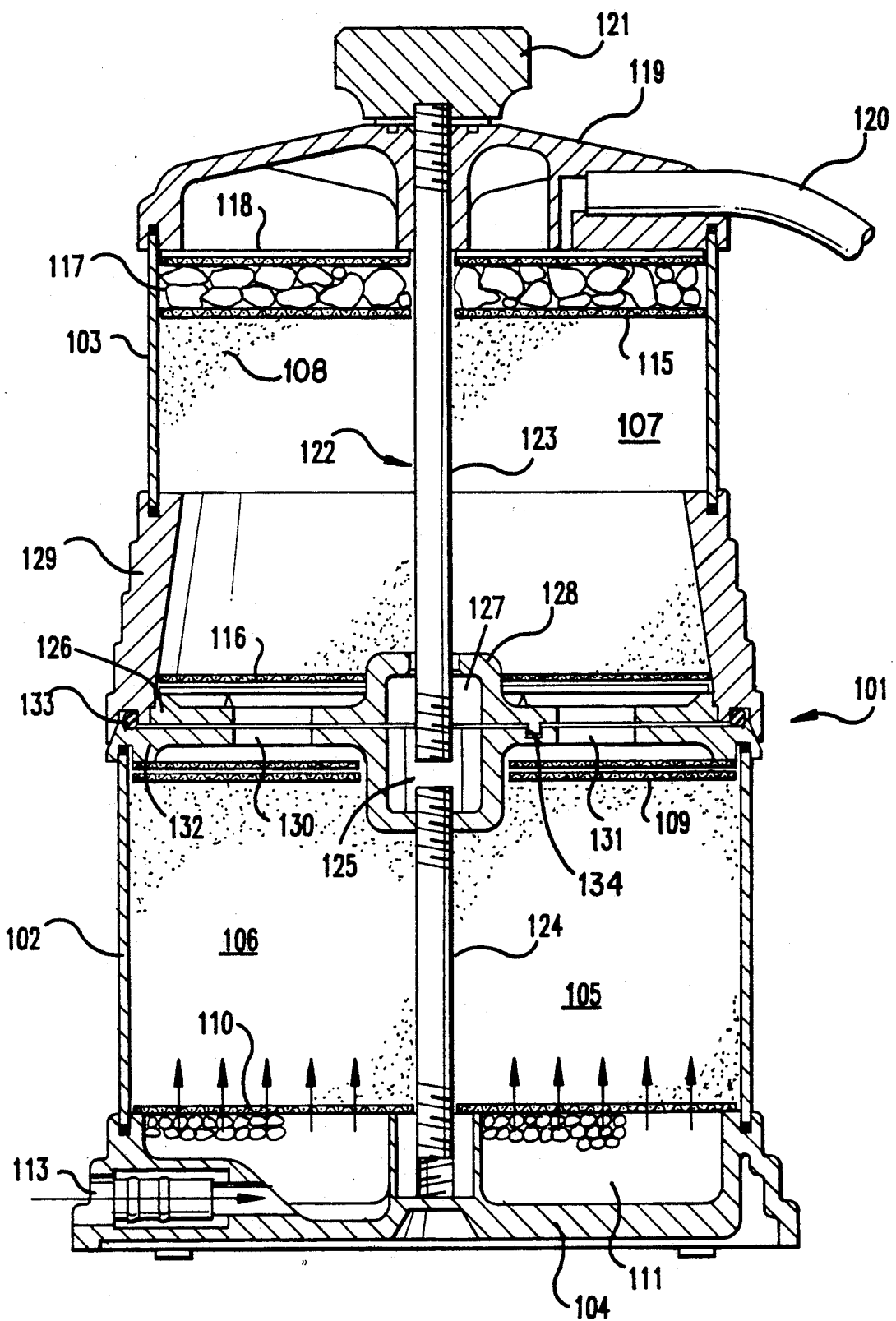
FIG. 4 is a cross-section view of another embodiment of a water conditioning apparatus according to the invention.

FIG. 4 shows another embodiment of the water conditioning or purifying apparatus 1. The embodiment 101 according to FIG. 4 differs from the embodiment shown in FIG. 1 basically as follows: The upper chamber 107 and the lower chamber 105 are separated from each other by an intermediate bottom, comprising the bottom 126 of chamber 107 and the top wall 132 of chamber 105. The intermediate bottom allows for mechanical separation and removal of the upper casing portion 103 and the lower casing portion 102 without problems. The upper portion 103 and the lower portion 102 may be handled as separate, closed units. Furthermore, the lower chamber 111 is in communication with the water input, such that inflowing water is supplied directly to the chamber 111 through the input pipe 113. The chamber 111 is filled with flince or the like, and the water flows upwards uniformly through the chamber 111 and over the entire cross-section of the apparatus 101 free of pressure and turbulence according to the updraft principle. Top wall 132 of lower chamber 105 and the bottom wall 126 of upper chamber 104 are arranged coincidently and receive a gasket 133 between themselves, which blocks the exit of water from the apparatus 101. The lower and the upper casing portions 102 and 103 respectively are fastened together by means of a bolt rod 122. Passages 130, 131 are arranged in coincidence within the top wall 132 and the bottom wall 126. The exact relative position between 126 and 132 is determined by a rotational lock 134. Member 129 forms the lower section of the shell of the upper casing portion 103. Handle 121, cover 119, Wall portion 129, bottoms 126 and 132 and bottom 14 are made of shockproof plastic material. Casing portions 102 and 103 as well as the connecting bolt 122 are made of stainless steel.

Figure 5:
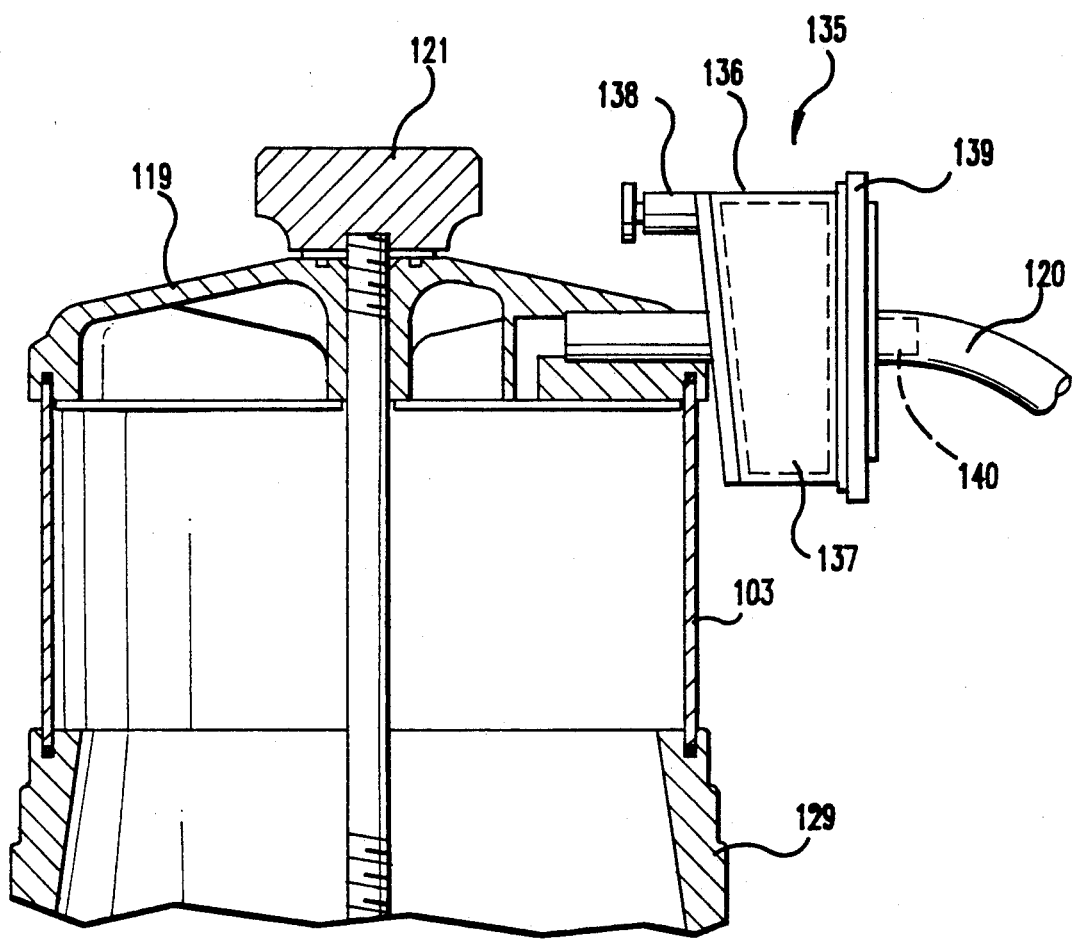
FIG. 5 is a further embodiment of the water conditioning apparatus according to FIG. 4.

The embodiment shown in FIG. 5 is identical with the embodiment shown in FIG. 4, however, the outlet 120 is provided with a germ membrane device 135 in order to treat the conditioned and purified water discharged from the filter apparatus by a further conditioning step, whereby any germs and bacteries will be sorted out and removed. Said germ membrane device 135 is arranged on the outside of the cover 119 and is connected to the outlet pipe 120. The germ membrane device 135 comprises a casing 136 for receiving a plate shaped filter membrane, a plurality of individual, thin filter discs, a filter fleece, or a corresponding other filter medium, such as those commercially available for filtering bacteries and germs. Ventilation means 138 is provided at the highest point of the interior of the casing 136. The casing 136 is fastened to the cover 119 firmly or removably. The face wall 139 of the casing 136, opposite to the apparatus 101, is provided with a cylindrical extension 140, to which the outer part of the outlet pipe 120 is connected.

I claim:

1. A water conditioning apparatus for removing contaminating materials from water, comprising a casing with a cover, shell and bottom, a water conditioning outlet in the cover, a pipe connection to a contaminated water inlet at the bottom, and activated carbon and anion exchange material located in said casing, through which the contaminated water to be conditioned flows in the direction from the contaminated water inlet to the water outlet, where conditioned water is discharged, wherein (a) the casing comprises a lower portion housing a first chamber filled with activated carbon and an upper portion housing a second chamber filled with anion exchange material, and
    (b) a first filter fleece is disposed at the top of each of said first and second chambers, and a second filter fleece is disposed at the bottom of each of said chambers, and wherein an impermeable two-part shaft having a first rod section and a second rod section is provided in the center axis of the casing; the first rod section of the shaft extends through the second chamber and through the cover and forms a handle; further provided is a connection between the second rod section and the first rod section of the shaft; the second rod section extends through the first chamber, and is releasably connected with the bottom of the apparatus.

2. A water conditioning apparatus according to claim 1, wherein the casing is cylindrical in shape and the two chambers substantially fill the entire volume of the lower and upper portions of the casing.

3. A water conditioning apparatus according to claim 1, wherein contaminated water flowing through lower and upper portions of said casing is distributed over the entire interior cross section uniformly such that the contaminated water travels with substantially constant speed and leaves the apparatus at the water outlet as conditioned water.

4. A water conditioning apparats according to claim 1, wherein the connection is a screw-type connection.

5. A water conditioning apparatus according to claim 1, wherein the second chamber includes a bottom surface with a central cylindrical projection, within which a recess is formed together with the upper portion of the first chamber, wherein the connection between the first and the second rod sections is arranged within said recess.

6. A water conditioning apparatus according to claim 1, further comprising a filter screen provided at the transition between the first chamber and the second chamber.

7. A water conditioning apparatus according to claim 1, wherein for shipment purposes the apparatus is arranged within a bucket-like container, which includes the entire accessories required for operating the apparatus, and which also can be used as the container for regenerating the anion exchange material by removing the upper portion of the apparatus from the lower portion and putting the upper portion upside down into the container or into a sink.

8. A water conditioning apparatus according to claim 1, wherein a first mineral chamber filled with mineral substances is provided between the contaminated water inlet and the first chamber.

9. A water conditioning apparatus according to claim 8, wherein the first mineral chamber is separated from the first chamber by a third filter fleece.

10. A method for conditioning water and for removing contaminating materials, the water being passed through an apparatus comprising, a chamber filled with activated carbon and a chamber filled with anion exchange material, wherein the water to be conditioned is passed in sequence through a filter fleece, a lower layer including mineral substances, a further filter fleece, a lower chamber receiving activated carbon, a passage between a lower and an upper casing portion, a further filter fleece, an upper chamber receiving the anion exchange material, a further filter fleece, an upper layer receiving mineral substances and a filter fleece joining this layer, to the water outlet, and wherein the water is urged upwardly from the bottom to the tom within the lower and the upper chamber is passed through a substantially continuous and constant cross section of said chamber filled with the activated carbon and said chamber filled with the anion exchange material.

11. The method according to claim 10, wherein the anion exchange material is regenerated by removing the upper part of the apparatus from the lower part of the apparatus, inverting the upper part, placing the upper part into a bucket or into a sink such that a water outlet at the top of the apparatus is connected with an uncontaminated water supply, and urging water provided with NaCl through the upper casing portion in an opposite direction to the direction of the normal operation.

12. A water conditioning apparatus for removing contaminating materials from water, comprising a casing with cover, shell and bottom, a water conditioning outlet in the cover, a pipe connection to a contaminating water inlet at the bottom, said casing being divided into a lower and an upper section, an activated carbon material located in one of said sections, an anion exchange material located in the other of said sections wherein the contaminated water to be conditioned flows in the direction from the contaminated water inlet to the water outlet, where conditioned water is discharged, and wherein
(a) the lower and the upper section are separate chambers of the casing,
(b) the outer walls of the lower and the upper section substantially form the peripheral wall of the casing and can be disassembled,
(c) an impermeable two-part shaft having a first rod section and a second rod section and a connection between the first rod section and the second rod section, wherein the shaft is provided in the center axis of the casing, the first rod section of the shaft extends through the second chamber and through cover, and the second rod section extends through the first chamber and is releasably connected within the bottom of the apparatus.

* * * * *